US012785972B2

(12) United States Patent
Scott et al.

(10) Patent No.: US 12,785,972 B2
(45) Date of Patent: *Nov. 3, 2026

(54) SYSTEMS AND METHODS FOR IMPLEMENTING COMPUTER TRANSMISSION SECURITY PROTOCOL

(71) Applicant: WIRESAFE LLC, San Francisco, CA (US)

(72) Inventors: Dale A. Scott, San Francisco, CA (US); Darius K. Scott, New York, NY (US)

(73) Assignee: WIRESAFE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/301,580

(22) Filed: Aug. 15, 2025

(65) Prior Publication Data

US 2025/0379740 A1 Dec. 11, 2025

Related U.S. Application Data

(63) Continuation-in-part of application No. 18/306,115, filed on Apr. 24, 2023, now Pat. No. 12,413,577.

(51) Int. Cl.
*H04L 9/32* (2006.01)

(52) U.S. Cl.
CPC ............ *H04L 9/3226* (2013.01); *H04L 9/321* (2013.01)

(58) Field of Classification Search
CPC .............................. H04L 9/3226; H04L 9/321
USPC .......................................................... 713/168
See application file for complete search history.

(56) References Cited

U.S. PATENT DOCUMENTS

| | | | | |
|---|---|---|---|---|
| 9,071,618 | B1 * | 6/2015 | Pruthi | H04L 63/105 |
| 11,070,540 | B1 * | 7/2021 | Singh | H04L 63/104 |
| 2014/0281525 | A1 * | 9/2014 | Acar | H04L 9/3226 713/168 |
| 2018/0343263 | A1 * | 11/2018 | Camenisch | H04L 9/3271 |
| 2023/0164143 | A1 * | 5/2023 | Richardson, IV | H04L 63/0876 726/6 |

* cited by examiner

*Primary Examiner* — Anthony D Brown
(74) *Attorney, Agent, or Firm* — ASHURST PERKINS COIE US LLP

(57) ABSTRACT

A computer-implemented method for performing a confirmation process via a resetting webpage form is disclosed. The method includes generating first and second sets of login credentials associated with a webpage form. The first set has at least read and edit privileges for the webpage form with respect to a webpage data, and the second set has at least read and verification privileges. The method further includes receiving edits to the webpage data, where the edits are associated with the first set of login credentials, providing a user interface of the webpage form that includes the edits, rejecting, by the second set of login credentials, the edits, and resetting the webpage form such that the webpage data is removed.

20 Claims, 8 Drawing Sheets

SYSTEMS AND METHODS FOR IMPLEMENTING COMPUTER TRANSMISSION SECURITY PROTOCOL

CROSS-REFERENCE TO RELATED APPLICATIONS

This application is a continuation-in-part of U.S. patent application Ser. No. 18/306,115, filed Apr. 24, 2023, which is incorporated by reference herein in its entirety.

BACKGROUND

Email is a method of exchanging messages between people using electronic devices. Email was conceived as the electronic (digital) version of, or counterpart to, mail, at a time when "mail" meant only physical mail. Email later became a ubiquitous communication medium, to the point that in current use, an email address is often treated as a basic and necessary part of many processes in business, commerce, government, education, entertainment, and other spheres of daily life in most countries. Email is the medium, and each message sent therewith is called an email.

Like other forms of information technology, email is vulnerable to attacks such as account hacking and information interception. Especially in the case of sensitive email information like work documents, private messages and financial transaction confirmations, these threats can result in identity theft, privacy loss and even financial losses.

BRIEF DESCRIPTION OF THE DRAWINGS

Detailed descriptions of implementations of the present invention will be described and explained through the use of the accompanying drawings.

Figure 1:
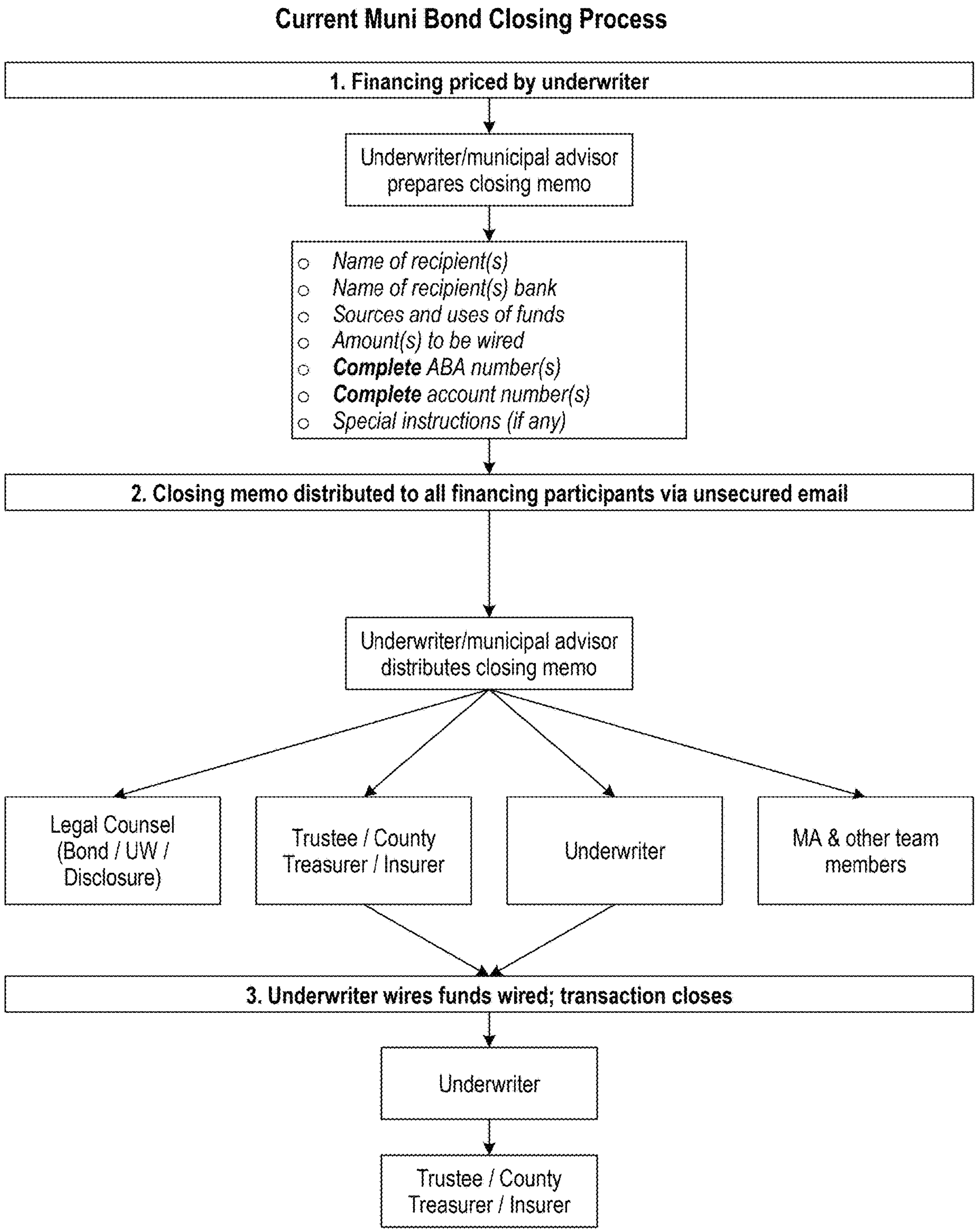
FIG. 1 illustrates a prior art process for conveying data across multiple parties using email.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A number of sensitive information transactions occur via email. Standard emailing is an inherently unsecure format to communicate data. Disclosed herein is a protocol whereby a resetting webpage is used to enable transfer of data and confirmation thereof. In some embodiments, in a given secured communication, multiple participants take part to confirm the veracity of data and make changes to the data where necessary. Where email is the primary format for the communication a man-in-the-middle (MITM) attack that changes some of the data (e.g., without the knowledge and/or consent of one or more of the participants, and/or after a corresponding party has confirmed that respective data) is problematic. Because the verifying party has already performed their verification, the MITM attack is enabled to make changes (e.g., change account numbers) without other parties becoming aware of the attack. MITM attacks can also occur at other times relative to confirmation of the communication (e.g., before confirmation of the information by the recipient and/or a verifying party), or even without any confirmation ever occurring. In such cases, unauthorized changes to the communication are introduced and risk being incorporated into the secured communication if they are not identified.

A resetting webpage makes use of login information for each party relevant to the secured communication. The data is read only with respect to all data that does not pertain to each given user and read/write for the data that does pertain to a given user. Data read/write restriction is delineated by login information. The webpage includes verification toggles whereby a party to the communication is enabled to verify the portion of the communication that pertains to them. However, if any changes are made to the data, all or a subset of the verification toggles reset. Thus, protocol dictates that any change to the data resets the communication thereby preventing the MITM attack that modifies data after confirmed.

Login information could be compromised, but if changes are made the verification toggles and/or information input into the webpage (e.g., ABA number, account number, party identities, etc.) reset alerting all parties to the change. Where the party with the compromised login did not personally make the change, the resetting of the webpage indicates that unauthorized changes were made and that the communication is compromised. An attacker in a MITM scenario largely seeks to go undetected, thus increasing visibility to the process where changes are made decreases the opportunities of MITM attackers and increases the chances that those same attackers are caught.

In some embodiments, information of the webpage (e.g., account numbers, ABA numbers, etc.) resets in response to one of the parties rejecting the information input by the other party. For example, a first party can enter account information into the webpage. A second party can review the account information input by the first party and identify a mistake and/or malicious entry/activity in the account information, and reject the information causing the webpage (including the account information) to reset. The account information will then need to be reentered by, for example, the first party. Once the account information has been entered and the second party concludes the entry is correct, the second party can verify the entry (and/or the entire webpage).

In some embodiments, one or more verification toggles reset in response to a user rejecting a previous verification of the data. For example, If a first user verifies data associated with the first user (e.g., data associated with the login information of the first user), a second use can identify a mistake or change to the data associated with the first user and reject the first user's verification. The second user can reject the verification before, after, or during the verification of the second user's verification of their own respective data (e.g., data associated with the login information of the second user). The first user's verification toggle can reset in response to the second user rejecting the verification. In some embodiments, all or a subset of all verification toggles of a plurality of users can reset in response to any one of the plurality of users rejecting another user's verification. In such embodiments, rejection of any one of the user's verification can occur before, after, or during verification of another user's respective data.

An example of such an information transaction is issuance of municipal bonds. In the process of issuing municipal securities, there is typically a two-week period between the sale of the securities and the time when funds are wired from the underwriter or some other purchaser of the bonds (the "Wire-Sender") to the recipient of the funds such as a trustee bank or escrow bank (the "Wire-Receiver). This process is referred to as the closing. During this time, documentation is prepared for the deal's closing. One of these documents is the closing memo that includes instructions regarding wiring of bond funds from the Wire Sender to the Wire Receivers. A wire transfer, bank transfer, or credit transfer is a method of electronic funds transfer from one person or entity to another. A wire transfer can be made from one bank account to another bank account, or through a transfer of cash at a cash office.

Different wire transfer systems and operators provide a variety of options relative to the immediacy and finality of settlement and the cost, value, and volume of transactions. Central bank wire transfer systems, such as the Federal Reserve's Fedwire system in the United States, are more likely to be real-time gross settlement (RTGS) systems, as they provide the quickest availability of funds. This is because they post the gross (complete) entry against electronic accounts of the wire transfer system operator. Other systems, such as the Clearing House Interbank Payments System (CHIPS), provide net settlement on a periodic basis. More immediate settlement systems tend to process higher monetary value time-critical transactions, have higher transaction costs, and have a smaller volume of payments. A faster settlement process allows less time for currency fluctuations while money is in transit.

The closing memo, typically prepared by either the municipal advisor or the underwriter, provides the full American Bankers Association (ABA) routing number and the full account number. Common practice is to send this memo to an entire financing team, which typically includes a group that will often exceed 25 people from various institutions involved in the transaction. The memo is sent via unsecured email. Understanding email vulnerability requires understanding how email works. In one example, unsecured email clients relay information between servers using a protocol known as Simple Mail Transfer Protocol (SMTP). A message is not sent directly to the recipient, but rather is stored on a variety of servers on its way to the destination—just like a letter making its way through regional and local post offices.

FIG. 1 illustrates a process for municipal bond closing. First, financing is priced by an underwriter. The underwriter or municipal advisor prepares a closing memo. The memo can include the name of recipients, names of recipient banks, sources and uses of funds, an amount to be wired, full ABA numbers, full account numbers, and any special instructions. The closing memo is distributed to all financing participants via an unsecured email. The underwriter or municipal advisor distributes the closing memo to individuals including legal counsel, trustee/county treasurer/insurer, underwriter, municipal advisor and other team members. The underwriter wires the funds and the transaction closes.

The disclosed technology improves security of the municipal bond closing process. Specifically, the technology includes an online platform that offers bond issuers an alternative method of confirming closing information to protect against potential cybertheft of bond funds. This is done with a private, secure multi-step process for verification of wire instructions (see FIGS. 4A and 4B). The platform acknowledges the fact that even email messages, even those sent through secure services, face the risk of being intercepted by or unknowingly released to third parties. As such, the platform offers an additional level of security (illustrated in FIGS. 4A and 4B).

In one embodiment, prior to the closing, both the underwriter and the Wire Receivers will pre-register with the platform. Once registration is confirmed, their participation in the particular financing transaction can be confirmed. On or near the day (e.g., several weeks) before the wire is to be sent, either the underwriter (or some other Wire-Sender) or the Wire Receivers will enter into the platform's portal (e.g., website) a) the amount to be wired; b) the bank routing number and c) the bank account number. While certain information (e.g., the amount of each wire) will be viewable by all other registered website participants, confidential information including account numbers will only be viewable to the Wire-Sender and the Wire-Receivers. Once information is entered by one of the two parties, it must be electronically confirmed or edited by the corresponding party. If edited, it must be reviewed and approved by the party that originally entered the information. Once approved by both parties if may not be altered. In the event edits are made by either party after the information has been approved by both the Wire-Sender and the Wire-Receiver, verification information is erased and the transaction information must be reentered from the beginning of the process. In some embodiments, once information is entered by one of the two parties, the corresponding party can reject any existing verifications and/or transaction information upon, for example, identifying a mistake or edit was made in the information entered by the first party. In such embodiments, verification information and transaction information is erased and the transaction information must be reentered before the information has been fully approved by both the Wire-Sender and the Wire-Receiver.

Figure 2:
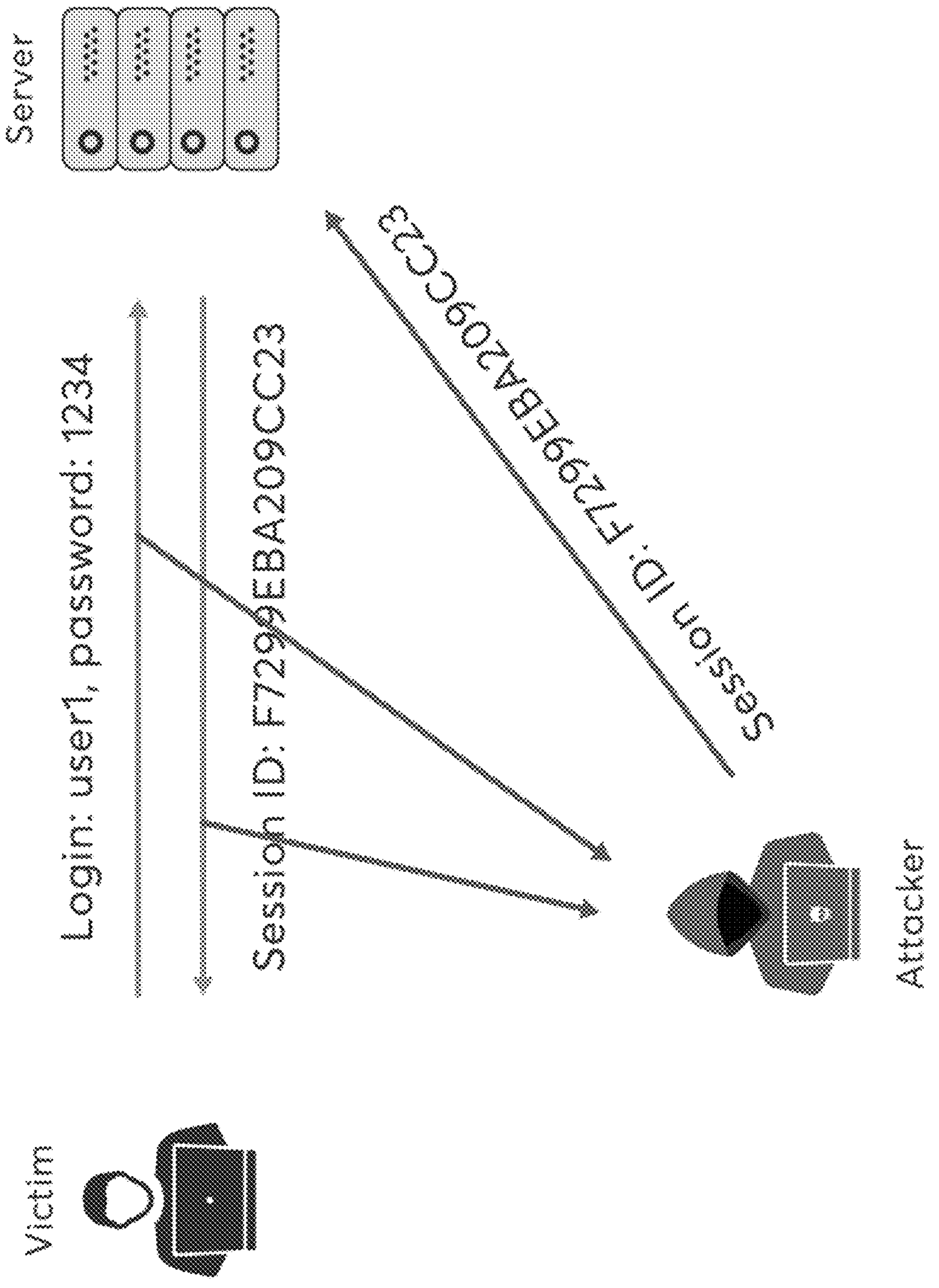
FIG. 2 illustrates an email format Man-In-The-Middle attack.

FIG. 2 illustrates an email format MITM attack. Any method that allows an attacker to read third-party communication between two people is considered a MITM attack. The attacker's goal is to stay undetected, so attackers will often breach a network or personal account to read information as two parties communicate and do nothing that would alert them of the attacker's activity.

One common method of MITM attack is email hijacking. Email hijacking is another form of man-in-the-middle attack, in which the hacker compromises and gain access to a target's email account. The attacker then silently monitors the communications between the client and the provider and uses the information for malicious purposes.

For instance, at an opportune moment, the attacker might send a message from the victim's account to their bank and instruct them to transfer funds to the attacker's bank account. They might also use the email to take over other online accounts tied to the email account. They may also alter data on attachments shared between a group of users as sent from the compromised user's email address.

Email hijacking is usually staged through phishing and other social engineering scams, in which attackers deceive victims into revealing their credentials by directing them to bogus login pages or tricking them into installing a keylogger malware, which records the victim's keystrokes and sends it to a remote server that the attacker owns.

Figure 3:
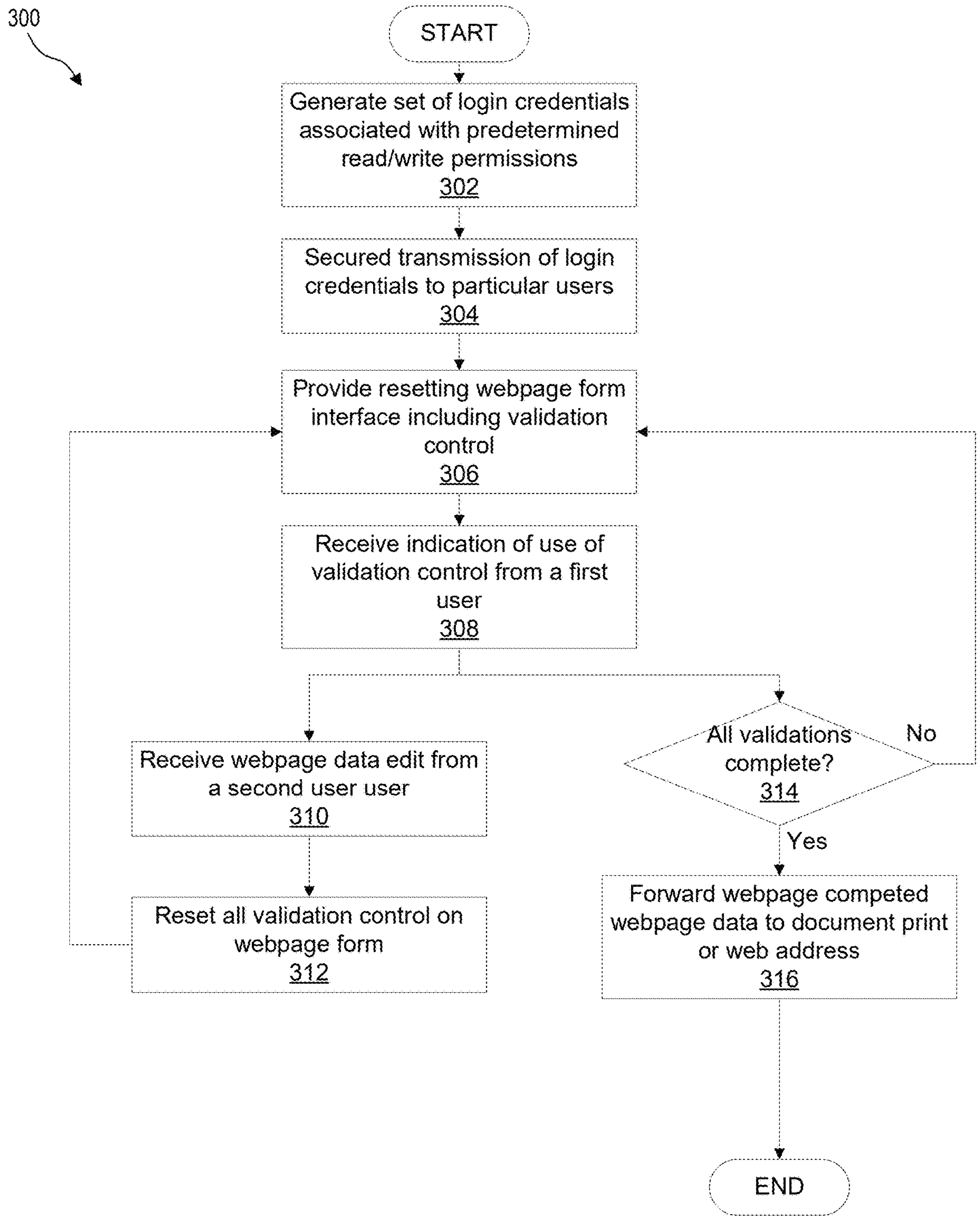
FIG. 3 illustrates a flowchart depicting a method for performing a bifurcated process confirmation via a resetting webpage form defending against man-in-the-middle attacks.

FIG. 3 illustrates a flowchart depicting a method for performing a bifurcated process confirmation via a resetting webpage form defending against man-in-the-middle attacks. In step 302, a host server generates a set of login credentials associated with two classes of users to a webpage form. The two classes of users include a first user class and a second user class. Examples of the user classes are parties to a transaction (sender/receiver) and validators or verification professionals overseeing the transaction. The different user classes have different permissions on the webpage form.

In some embodiments, the set of login credentials associated with the first user class has only limited read and verification privileges on the webpage form with respect to webpage data. That is, those users may read the information on the webpage form, but not edit that information. However, those users are enabled to verify the veracity of the information through a user interface control (e.g., a sign off or a check box). In some embodiments, those users are only able to read the portions of the webpage data that they themselves are validating/verifying. In some embodiments, the set of login credentials associated with the second user class has both read and edit privileges on the webpage form with respect to webpage data. For example, the sender and receiver in the transaction are enabled to read all of the webpage data and edit all of it as well. In some embodiments, the sender and receiver in the transaction are enabled to read portions of the webpage data associated with the other user (e.g., the sender can read the webpage data associated with the receiver and vice versa), but edit only the portion of the webpage data associated with themselves (e.g., the sender can only edit data associated with the login credentials of the sender). In some embodiments, the sender and receiver are enabled to read and edit only those portions of the webpage data associated with themselves, while the validators (e.g., the first user class) can read and verify all of the webpage data.

In step 304, the host server transmits the set of login credentials to associated users via a two-party secured key exchange. Examples of two-party secured key exchanges are a Diffie-Hellman exchange or Rivest-Shamir-Adleman key exchange, though it will be appreciated that the present technology can include any two-party secured key exchange. Diffie-Hellman key exchanges are a method of digital encryption that securely exchanges cryptographic keys between two parties over a public channel without their conversation being transmitted over the internet. The two parties use symmetric cryptography to encrypt and decrypt their messages. The Diffie-Hellman key exchange is commonly found in security protocols, such as Transport Layer Security (TLS), Secure Shell (SSH) and IP Security (IPsec).

Even though Diffie-Hellman key exchange can be used for establishing both public and private keys, the Rivest-Shamir-Adleman algorithm, or RSA algorithm, can also be used, since the RSA algorithm is able to sign public key certificates.

To implement Diffie-Hellman, two end users, Alice and Bob, mutually agree on positive whole numbers p and q, such that p is prime and q is a generator of p. The generator q is a number that, when raised to positive whole-number powers less than p, never produces the same result for any two such whole numbers. The value of p may be large, but the value of q is usually small.

Once Alice and Bob have agreed on p and q in private, they choose positive whole-number personal keys a and b. Both are less than the prime number modulus p. Neither user divulges their personal key to anyone; ideally, they memorize these numbers and don't write them down or store them anywhere. Next, Alice and Bob compute public keys a* and b* based on their personal keys. The two users can share their public keys a* and b* over a communications medium assumed to be insecure, such as the internet or a corporate wide area network. From these public keys, a number x can be generated by either user on the basis of their own personal keys.

The value of x turns out to be the same according to either of the above two formulas. However, the personal keys a and b, which are critical in the calculation of x, haven't been transmitted over a public medium. Because it's a large and apparently random number, a potential hacker has almost no chance of correctly guessing x, even with the help of a powerful computer to conduct millions of trials. The two users can, therefore, in theory, communicate privately over a public medium with an encryption method of their choice using the decryption key x. The above description relates to entities, "Alice" and "Bob," however, these entities are merely exemplary and may be computing devices.

In step 306, the host server provides a user interface of the webpage form that includes a verification control associated with each of a plurality of users of the first user class bifurcating verification of the webpage data to each corresponding set of login credentials of the first user class. Non-limiting examples of verification control include a small DocuSign™ field, a check box or radio button, a manual signature input, a text field seeking matching data as the data verified, or a s-signature field. In some embodiments the individual users of the first class of user only view/read the portions of the webpage form as is validated by them.

In step 308, the webpage form receives a verification indication from a first user of the first user class via a first user's login credentials. The associated user reviews the data and in the course of operation validates that information. The validation is indicated through the user interface control. If this step does not occur (e.g., the data validation is rejected) the user may indicate that through interface controls or include notes on the data on the webpage form. Alternatively, an offline communication may indicate that some issue exists.

In step 310, after a validation is received, the webpage form receives a modification to the webpage data from a second user of the second user class via a second user's login credentials. That is, a user logged in to the webpage form with write privileges and makes a change to the webpage data. In order for this user to be an attacker, the credentials need to have become compromised.

In step 312, in response to receiving the modification to the webpage data, the webpage form resets each of the verification controls associated with each of the first user class including the verification control associated with the first user's login credentials. Thus, anytime an edit or a rejection (e.g., from one or more members of the first user classes) in the webpage form data occurs all of the verification users need to reverify the data. Unlike email communications which do not necessarily have any version control aspects, the webpage form resets upon receipt of an edit to the webpage data.

In the event the editing user's login credentials had become compromised, at least one (e.g., all) of the verifying users are alerted to the change because their verification is reversed, and those users each individually need to reverify anything they had previously verified. The bane of the MITM attacker is alerts that something had changed. In order to attack the resetting webpage, the MITM attacker would need to compromise all users in the information transaction.

In step 314, the host server determines whether all of the validation controls have been completed. In step 316, in response to completion of each verification control, the host server generates an unmodifiable electronic document of current webpage data or transmits the current webpage data to an address indicated by the current webpage data. In some embodiments the address may be that of an underwriter, a trustee, a county treasurer, or an insurer, or all of the above. The unmodifiable document enables records to be kept.

Figure 4A:
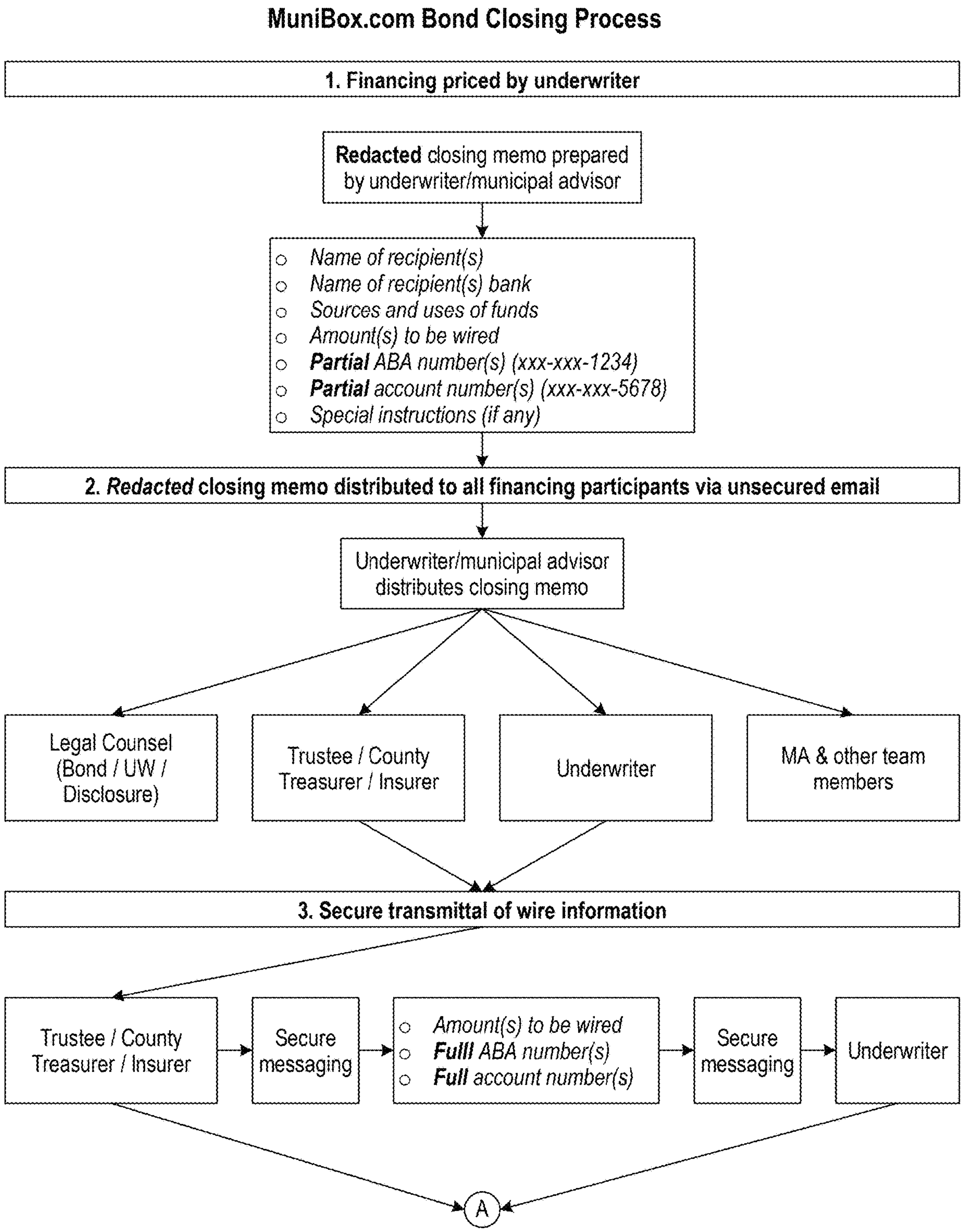
FIGS. 4A and 4B illustrate a bifurcated protocol for conveying data across multiple parties via a resetting webpage.
Figure 4B:
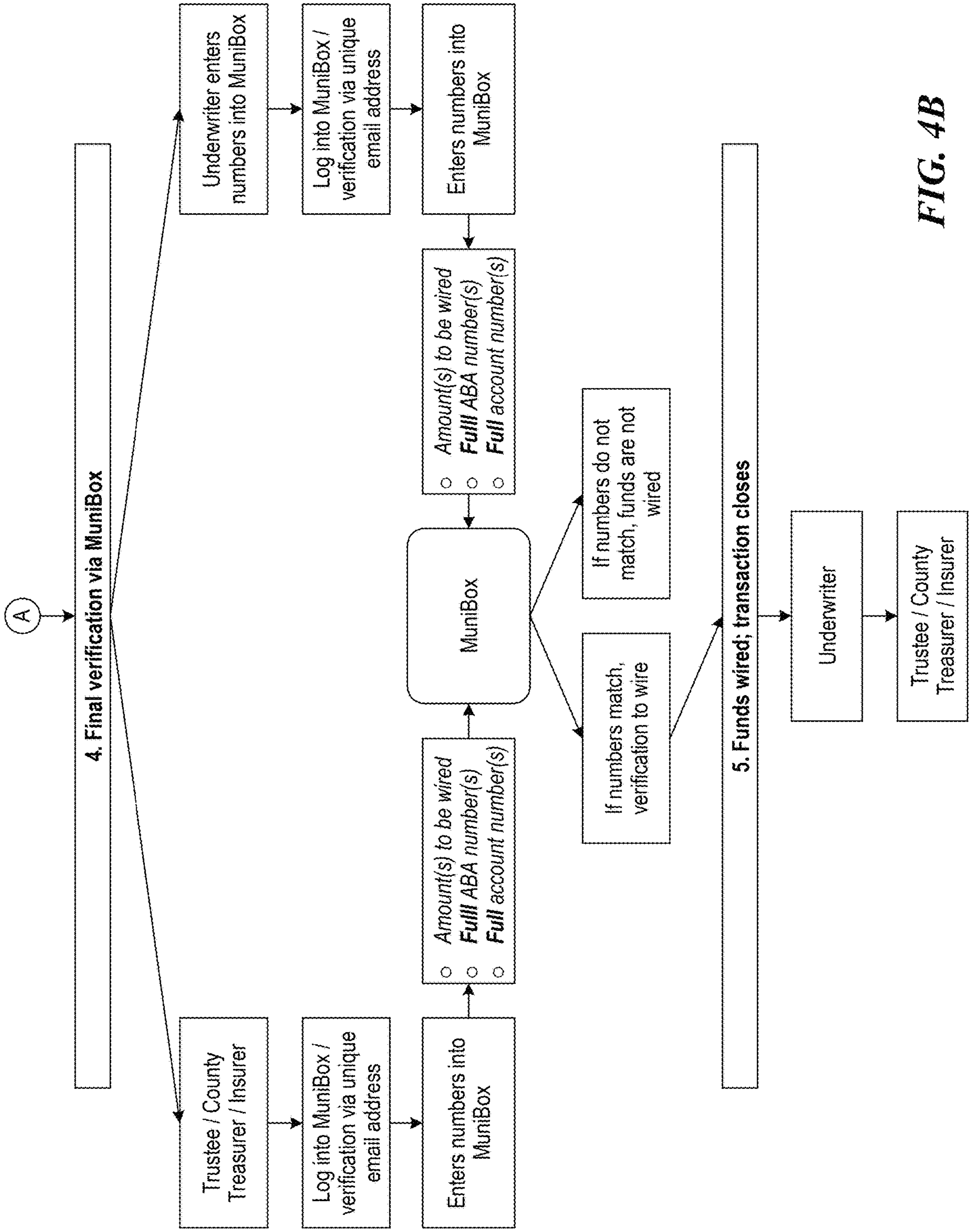

FIGS. 4A and 4B illustrate the system for performing a bifurcated process confirmation via a resetting webpage form defending against man-in-the-middle attacks.

The platform receives an indication of information included in an electronic closing memo. The closing memo is a document prepared by an underwriter or municipal advisor. The information includes a name of a recipient, a name of a recipient bank, a source and use of funds, an amount of funds to be wired, an ABA number (partial or full), an account number (partial or full), and/or a special instruction. Copies of the electronic closing memo are distributed, via an unsecured or secured email, to all participants of the financial transaction including legal counsel, trustee/county treasurer, underwriter, municipal advisor and other team members.

The platform performs bifurcated verification of the financial transaction where each of a first party (e.g., the Wire-Receivers) and a second party (e.g., the Wire-Sender) independently logs onto the platform and either input, verify and accept or edit the information including amounts to be wired, the full ABA numbers, and the full account number.

Computer System

Figure 5:
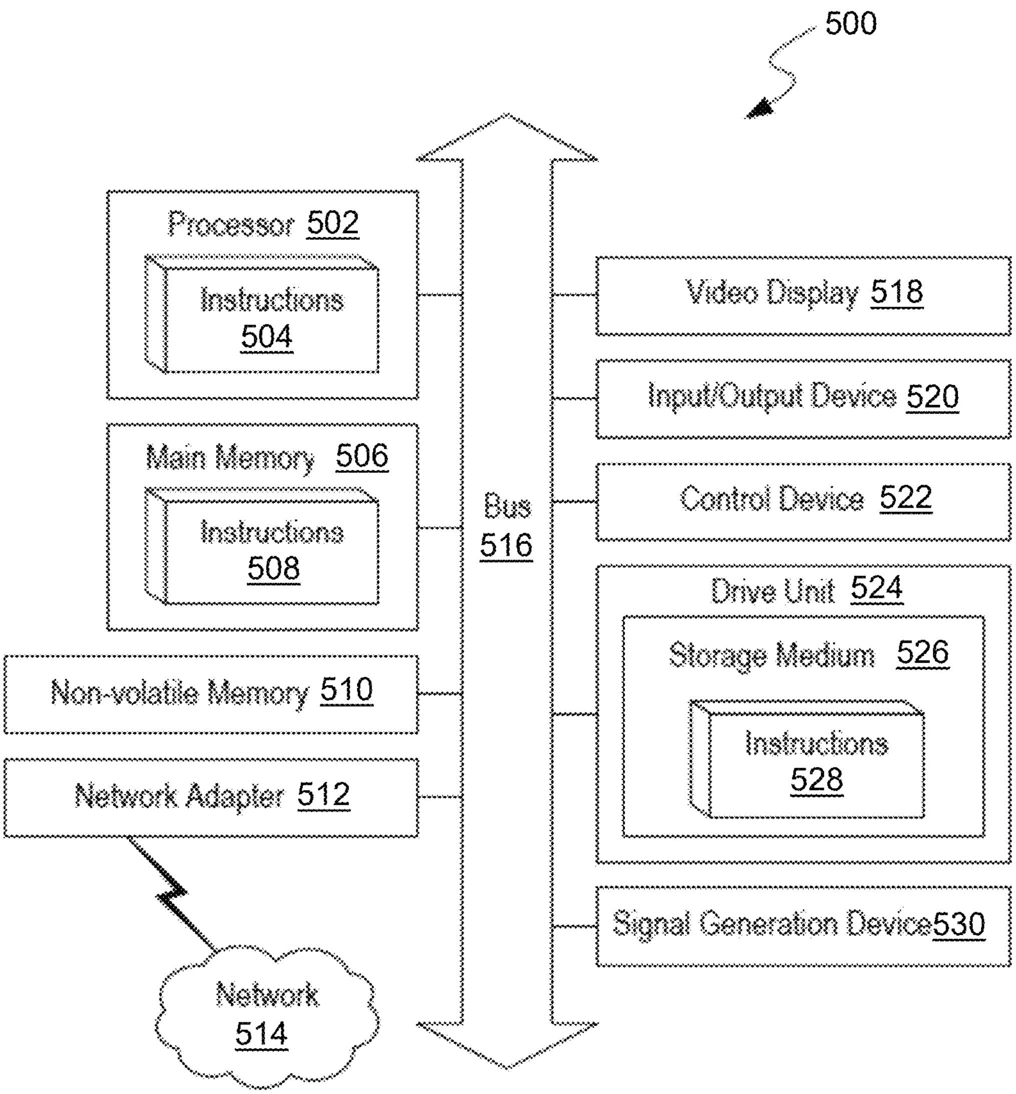
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Figure 6:
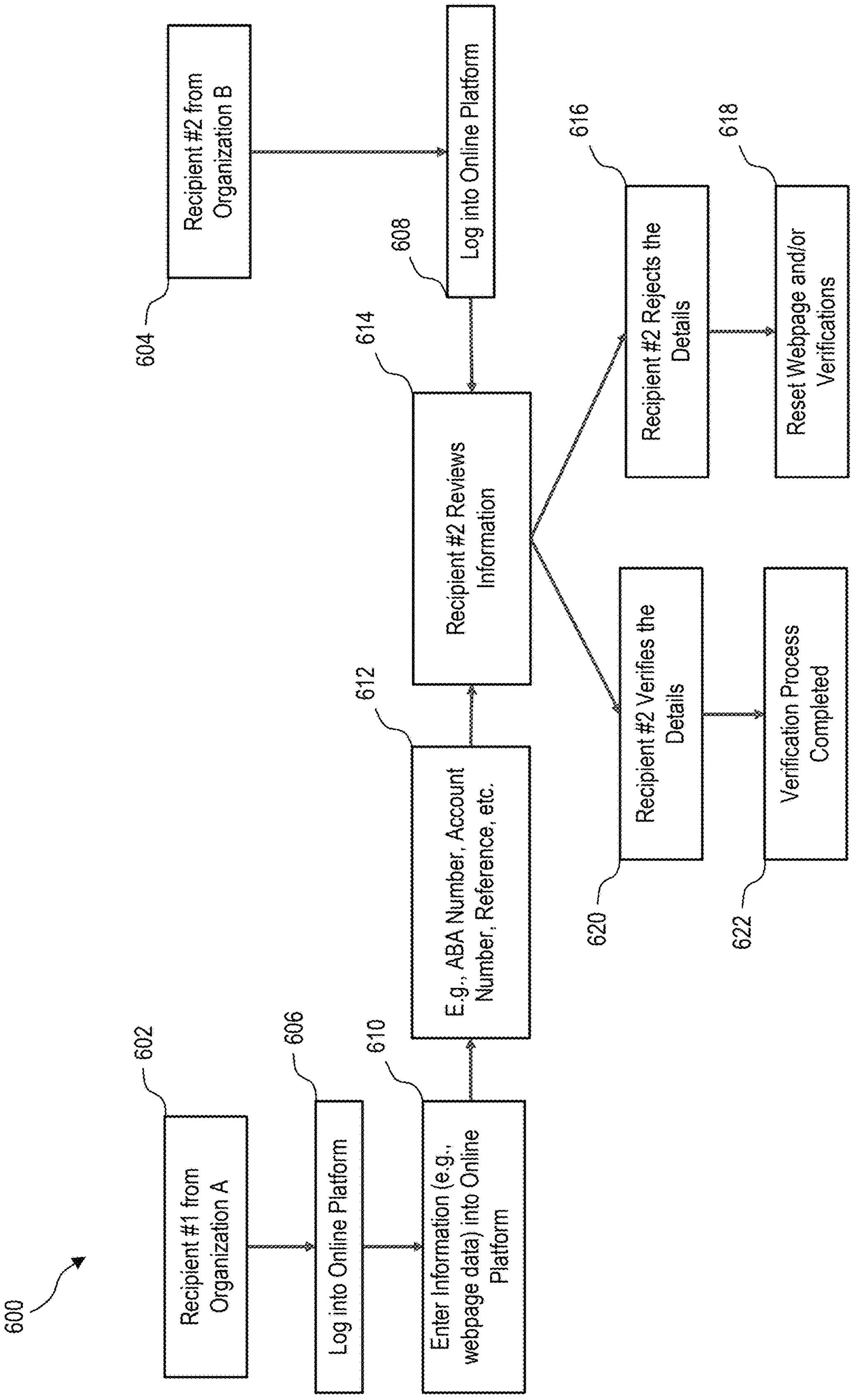
FIG. 6 illustrates a process for verifying resetting webpage data.

FIG. 6 illustrates a process 600 for verifying resetting webpage data, in accordance with embodiments of the present technology. In some embodiments process 600 are implemented via features and/or components discussed with reference to method 300 of FIG. 3, the system of FIGS. 4A and 4B, and/or the computer system 500 of FIG. 5. Process 600 illustrates the multi-recipient information verification workflow between recipients from different organizations (e.g., recipient #1 from Organization A and recipient #2 from Organization B).

Process 600 begins with block 602 identifying a first recipient from Organization A and block 604 identifying a second recipient from Organization B. In alternative implementations both recipients can come from the same organization (e.g., Organization A). Distinct login credentials are generated for each recipient, where the login credentials associated with each recipient have limited read, edit, reject, and verification privileges restricted to specific portions of the webpage data that the particular recipient validates, rather than providing full read access to all webpage data. This compartmentalized access structure ensures that each recipient accesses only the data segments relevant to their verification responsibilities.

In some embodiments, the login credentials are transmitted to the associated recipients via a two-party secured key exchange, specifically utilizing Diffie-Hellman or Rivest-Shamir-Adleman key exchange protocols. The secured transmission prevents unauthorized interception of the authentication credentials during the distribution process. At block 606 the first recipient logs into the online platform using the transmitted credentials. Similarly, at block 608, the second recipient logs into the online platform with their respective credentials.

Following the login procedures, at block 610, the first recipient enters information into the online platform. Block 612 demonstrates examples of the entered information, such as ABA numbers, account numbers, and references that form the webpage data. The information entry occurs through a user interface that provides the webpage form, with the first recipient's access permissions allowing both read and edit privileges for their designated webpage form portions. The entered information becomes available for review by other authorized recipients according to their respective access privileges.

At block 614, the second recipient reviews the information that was entered by the first recipient. The review process involves, for example, the second recipient examining the webpage data through their limited read access permissions, focusing on the specific portions designated for their verification responsibilities. The second recipient evaluates the accuracy and completeness of the entered information, checking for potential errors or inconsistencies that would affect the transaction integrity. Following the review, process 600 branches into two distinct paths based on the second recipient's assessment of the information.

In one path, shown by block 616, the second recipient rejects the details received from the first recipient. At block 618 the webpage (and any verification controls/toggles associated with the webpage data) reset. The rejection triggers a reset mechanism that clears the entered information from the webpage form and returns all verification controls to their initial (unverified) state. This reset functionality prevents the propagation of incorrect or potentially compromised information.

Alternatively, shown by block 620, the second recipient verifies the details. Once each portion of the webpage form is verified, verification of the resetting webpage form is complete (as shown at block 622).

Figure 7:
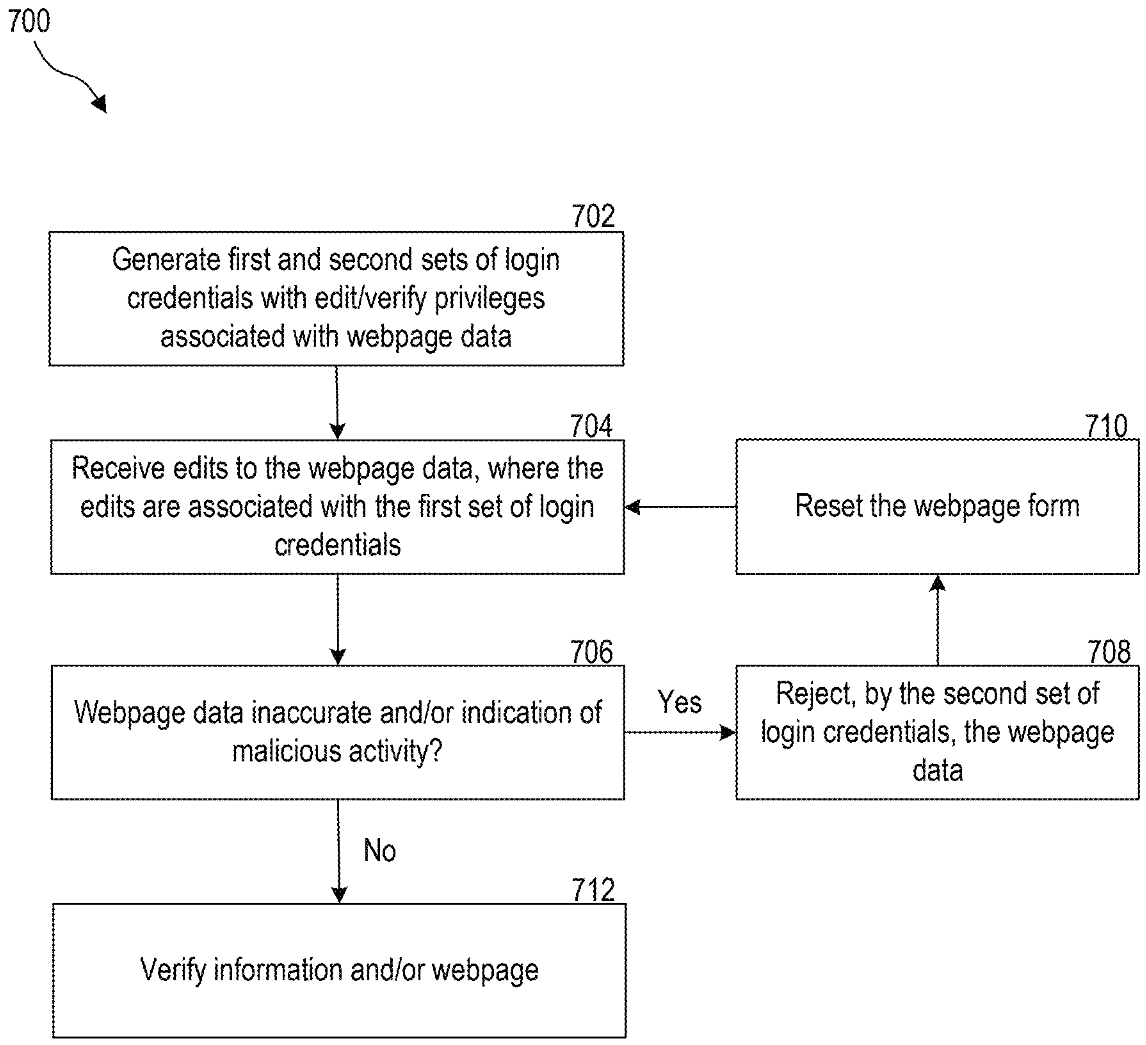
FIG. 7 illustrates a flowchart depicting a method for verifying resetting webpage data.

FIG. 7 illustrates a flowchart depicting a method 700 for verifying resetting webpage data. In some embodiments method 700 is implemented via features and/or components discussed with reference to method 300 of FIG. 3, the system of FIGS. 4A and 4B, the computer system 500 of FIG. 5, and/or process 600 of FIG. 6.

At block 702, first and second sets of login credentials are generated. The first set of login credentials is associated with a first user to a resetting webpage form, and have at least read and edit privileges for at least a portion of the webpage form with respect to a webpage data. The second set of login credentials is associated with a second user to the resetting webpage form, and have at least read, reject, and verify privileges for at least the portion of the webpage with respect to the webpage data.

In some embodiments, the read and edit privileges of the first set of login credentials are restricted to a first portion of the webpage form such that the first user (or any entity with access to the first set of login credentials) are unable to read or edit a second portion of the webpage form (e.g., the rest of the webpage form different from the first portion).

At block 704, one or more edits to the webpage data are received, where the edits are associated with the first set of login credentials. For example, the first user associated with the first set of login credentials can input recipient information, an account number, and/or an ABA number. As an additional example, a malicious entity can input such information using a comprised version of the first set of login credentials. In some embodiments, a verification indication is received from the first set of login credentials alerting the transacting parties (e.g., the second user) that the webpage data has been verified and is ready for review/acceptance.

At block 706, the webpage data is reviewed for accuracy and/or any indication of malicious activity. For example, the second user associated with the second set of login credentials can review the webpage data received from the first set of login credentials.

At block 708, the second set of login credentials rejects the webpage data. For example, the second user associated with the second login credentials can identify a mistake in the account number received from the first set of login credentials.

At block 710, the webpage form is reset such that the webpage data (including the edits to the webpage data) are removed from the webpage form. In some embodiments, one or more verification controls associated with the webpage data are reset. In some embodiments, in response to the rejection, a second webpage data (and corresponding verification) is reset, to ensure that similar errors or malicious inputs throughout the webpage form are reset and need to be reentered before verification. In some embodiments, one or more additional webpage data for which the first set of login credentials had edit privileges is reset. In some embodiments, one or more additional webpage data that share similar characteristics as the rejected webpage data (e.g., ABA numbers, account numbers, etc.) are reset, regardless of the login credentials that had edit privileges for that webpage data.

In some embodiments, the method 700 then returns to block 704 when, for example, the first user associated with the first set of user credentials re-enters corrected edits. In some embodiments, once the webpage data is reviewed for accuracy and/or malicious activity, at least the portion of the webpage form edited/read by the first set of login credentials is verified by the second set of login credentials (as shown in block 712). In some embodiments, a verification indication is received from the second set of login credentials, alerting the parties that the webpage data is verified.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A system for performing a confirmation process via a resetting webpage form, the system comprising:
- a host server operated by a processor; and
- a memory including instructions that when executed cause the host server to:
- generate a first set of login credentials associated with a first user to a webpage form, wherein the first set of login credentials has at least read and edit privileges for the webpage form with respect to a webpage data;
- generate a second set of login credentials associated with a second user to the webpage form, wherein the second set of login credentials has at least read and verification privileges for the webpage form with respect to the webpage data;
- receive one or more edits to the webpage data associated with the first set of login credentials;
- provide to the second user a user interface of the webpage form that includes the one or more edits;
- reject, by the second set of login credentials, the one or more edits to the webpage data; and
- in response to the rejection, reset the webpage form such that the webpage data is removed from the webpage form.

2. The system of claim 1 wherein the memory further includes instructions that when executed cause the server to receive a verification indication of the webpage data, the verification indication associated with the first set of login credentials.

3. The system of claim 1 wherein the memory includes instructions that when executed cause the server to, in response to the rejection, reset one or more verification controls associated with the webpage data.

4. The system of claim 1 wherein the memory includes instructions that when executed cause the server to transmit the first and second sets of login credentials to the first and second users, respectively, via a two-party secured key exchange between the host server and the respective associated user.

5. The system of claim 1 wherein the read and edit privileges of the first set of login credentials are restricted to a portion of the webpage form, such that the first user is only able to read or edit the portion of the webpage form.

6. The system of claim 1 wherein the webpage data is a first webpage data, and wherein the memory includes instructions that when executed cause the server to, in response to the rejection, reset the webpage form such that a second webpage data is removed from the webpage form, wherein the first set of login credentials had read and edit privileges of the second webpage data.

7. The system of claim 1 wherein the memory includes instructions that when executed cause the server to:

subsequent to resetting the webpage form, receive additional edits to the webpage data associated with the first set of login credentials;

provide, to the second user, the user interface of the webpage form that includes the additional edits; and receive, from the second set of login credentials, a verification indication associated with the webpage data.

8. The system of claim 1 wherein the webpage data is associated with a municipal bond closing, and wherein the one or more edits includes a name of a recipient, a name of a recipient bank, a source and use of funds, an amount of funds to be wired, an ABA number, or an account number.

9. A method for performing a confirmation process via a resetting webpage form, the method comprising:

generating a first set of login credentials associated with a first user to a webpage form, wherein the first set of login credentials has at least read and edit privileges for the webpage form with respect to a webpage data;

generating a second set of login credentials associated with a second user to the webpage form, wherein the second set of login credentials has at least read, rejection, and verification privileges for the webpage form with respect to the webpage data;

receiving one or more edits to the webpage data associated with the first set of login credentials;

providing, to the second user, a user interface of the webpage form that includes the one or more edits;

rejecting, by the second set of login credentials, the one or more edits to the webpage data; and in response to the rejection, resetting the webpage form such that the webpage data is removed from the webpage form.

10. The method of claim 9, further comprising receiving a verification indication of the webpage data, the verification indication associated with the first set of login credentials.

11. The method of claim 9, further comprising, in response to the rejection, resetting one or more verification controls associated with the webpage data.

12. The method of claim 9, further comprising transmitting the first and second sets of login credentials to the first and second users, respectively, via a two-party secured key exchange between a host server and the respective associated user.

13. The method of claim 9 wherein the read and edit privileges of the first set of login credentials are restricted to a first portion of the webpage form, such that the first user is unable to read or edit a second portion of the webpage form that is different from the first portion of the webpage form.

14. The method of claim 9 wherein the webpage data is a first webpage data, the method further comprising, in response to the rejection, resetting the webpage form such that a second webpage data is removed from the webpage form, wherein the first set of login credentials had at least read and edit privileges of the second webpage data.

15. The method of claim 9, further comprising:

subsequent to resetting the webpage form, receiving additional edits to the webpage data associated with the first set of login credentials;

providing, to the second user, the user interface of the webpage form that includes the additional edits; and receiving, from the second set of login credentials, a verification indication associated with the webpage data.

16. A non-transitory computer-readable medium having executable instructions stored thereon for performing a confirmation process via a resetting webpage form, that when executed by one or more processors, perform the operations of:

generate a first set of login credentials associated with a first user to a webpage form, wherein the first set of login credentials has at least read and edit privileges for the webpage form with respect to a webpage data;

generate a second set of login credentials associated with a second user to the webpage form, wherein the second set of login credentials has at least read and verification privileges for the webpage form with respect to the webpage data;

receive one or more edits to the webpage data associated with the first set of login credentials;

provide to the second user a user interface of the webpage form that includes the one or more edits;

reject, by the second set of login credentials, the one or more edits to the webpage data; and in response to the rejection, reset the webpage form such that the webpage data is removed from the webpage form.

17. The non-transitory computer-readable medium of claim 16 wherein the medium further includes instructions that when executed perform the operation of:

receive a verification indication of the webpage data, the verification indication associated with the first set of login credentials.

18. The non-transitory computer-readable medium of claim 16 wherein the medium further includes instructions that when executed perform the operation of:

in response to the rejection, reset one or more verification controls associated with the webpage data.

19. The non-transitory computer-readable medium of claim 16 wherein the medium further includes instructions that when executed perform the operation of:

transmit the first and second sets of login credentials to the first and second users, respectively, via a two-party secured key exchange between a host server and the respective associated user.

20. The non-transitory computer-readable medium of claim 16 wherein the medium further includes instructions that when executed perform the operations of:

subsequent to resetting the webpage form, receive additional edits to the webpage data associated with the first set of login credentials;

provide, to the second user, the user interface of the webpage form that includes the additional edits; and receive, from the second set of login credentials, a verification indication associated with the webpage data.

* * * * *